US006305867B1

(12) United States Patent
Schweigert et al.

(10) Patent No.: US 6,305,867 B1
(45) Date of Patent: Oct. 23, 2001

(54) CONNECTION FOR THE SECTIONS OF A SEPARABLE GUIDE TUBE AND OF A DRIVE SHAFT DISPOSED THEREIN

(75) Inventors: Thomas Schweigert, Kernen; Peter Götzenberger, Korb; Steffen Obst, Grunbach; Klaus-Martin Uhl, Baltmannsweiler; Helmut Unger, Waiblingen, all of (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/321,668

(22) Filed: May 28, 1999

(30) Foreign Application Priority Data

May 29, 1998 (DE) ........................................ 298 09 694 U
May 3, 1999 (DE) ........................................ 299 07 780 U

(51) Int. Cl.[7] ........................................ F16D 1/02

(52) U.S. Cl. ........................... 403/14; 403/305; 403/334; 30/296.1

(58) Field of Search ............................... 403/13, 14, 300, 403/305, 301, 383, 24, 333, 334; 464/162; 30/296.1

(56) References Cited

U.S. PATENT DOCUMENTS 3,423,957 * 1/1969 Palmer ............................ 403/305 X
3,625,554 * 12/1971 Mottais et al. .................. 403/383 X
3,667,787 * 6/1972 Semour ........................... 403/383 X
4,045,980 * 9/1977 Woodward et al. ................ 464/162
4,122,601 10/1978 Katsuya .
4,505,040 * 3/1985 Everts ................................ 30/296.1
4,733,471 * 3/1988 Rahe .............................. 30/296.1 X
5,175,932 * 1/1993 Lange et al. .................... 30/296.1 X
5,819,418 * 10/1998 Uhl ...................................... 30/296.1
5,878,627 * 3/1999 McMurtrey ...................... 403/305 X
5,984,564 * 11/1999 Mitterreiter ......................... 403/305

* cited by examiner

*Primary Examiner*—Harry C. Kim
(74) *Attorney, Agent, or Firm*—R. W. Becker & Associates; R. W. Becker

(57) ABSTRACT

A connection is provided for the sections of a separable guide tube and of a drive shaft disposed therein. Shaft sections of the drive shaft are interlockingly coupled together, wherein the ends of the shaft sections interengage one another. One of the shaft sections has an insertion end having a rotationally symmetrical non-circular cross-sectional configuration. A drive sleeve is coaxially secured to the other shaft section and has a coupling cross-sectional configuration that corresponds to the insertion end. Which is introduceable into the driving sleeve. An axial introduction adapter is provided on the driving sleeve and has at least one inwardly projecting introduction ramp, which extends over an angle of curvature between two adjacent large diameters of the coupling cross-sectional configuration of the driving sleeve. The introduction ramp includes an axially decreasing ramp surface that forms a shoulder for the insertion end.

20 Claims, 4 Drawing Sheets

CONNECTION FOR THE SECTIONS OF A SEPARABLE GUIDE TUBE AND OF A DRIVE SHAFT DISPOSED THEREIN

BACKGROUND OF THE INVENTION

The present invention relates to a connection for the sections of a separable, i.e. multi-section, guide tube and of a drive shaft disposed therein, especially a connection for the tool of a manually guided free-cutting device, whereby the tube sections are axially interconnected, and the shaft sections are interlockingly coupled together, with the ends of the shaft sections interengaging one another.

The guide tube, and the drive shaft disposed therein, are separable to facilitate transport of, in particular, a manually guided free-cutting device. In this connection, the guide tube serves for guiding the tool, which is adapted to be driven by the drive shaft. The drive shaft is connected to a drive motor, which is disposed on that side of the guide tube opposite from the tool. A free-cutting device of this general type is know from U.S. Pat. No. 4,122,601. In this device, the tube sections of the guide tube are plug connected together, whereby the end of one of the tube sections carries the coupling sleeve into which extends a coupling element that is fixed at the end of the other tube section. The detachable plug connection can be secured by clamping elements. The shaft sections are coupled together in order to transmit the torque. With the known free-cutting device, on the one hand the transmission of force is proposed by a free running roller clutch, whereby the end of one of the shaft sections projects into a coupling drum secured to the end of the other shaft section, and the force transmission is effected in a frictionally engaging manner by means of the clutch rollers that rotate between the respective outer surfaces. Unfortunately, the assembly of this known connection is extremely complicated, and it has been repeatedly demonstrated that during connection of the sections of the guide tube, the shaft sections that remain non visible in the tube do not properly cooperate with one another. Furthermore, this known patent discloses a connection of the shaft sections by means of a dog clutch or coupling. The clutch parts that belong together, and which are respectively secured to the adjacent ends of the shaft sections that are to be connected, interlockingly couple and interengage in a specific angular rotational position. However, during assembly of the guide tube/drive shaft the clutch halves are normally not disposed in the required angular rotational position relative to one another, so that one of the shaft sections must be rotated into the proper position, which is expediently done by a second person. Here also the assembly of the free-cutting device is extremely complicated and time consuming, since more or less a number of tries to obtain the angular rotational positioning of the clutch parts are necessary and often during the connection of the parts of the guide tube the positive and interlocking connection between the drive shaft sections does not result.

It is therefore an object of the present invention to improve the connection of the aforementioned general type in such a way that a simple and reliable assembly of the guide tube and of the drive shaft is possible.

BRIEF DESCRIPTION OF THE DRAWINGS

This object, and other objects and advantages of the present invention, will appear more clearly from the following specification in conjunction with accompanying schematic drawings, in which.

SUMMARY OF THE INVENTION

Figure 1:
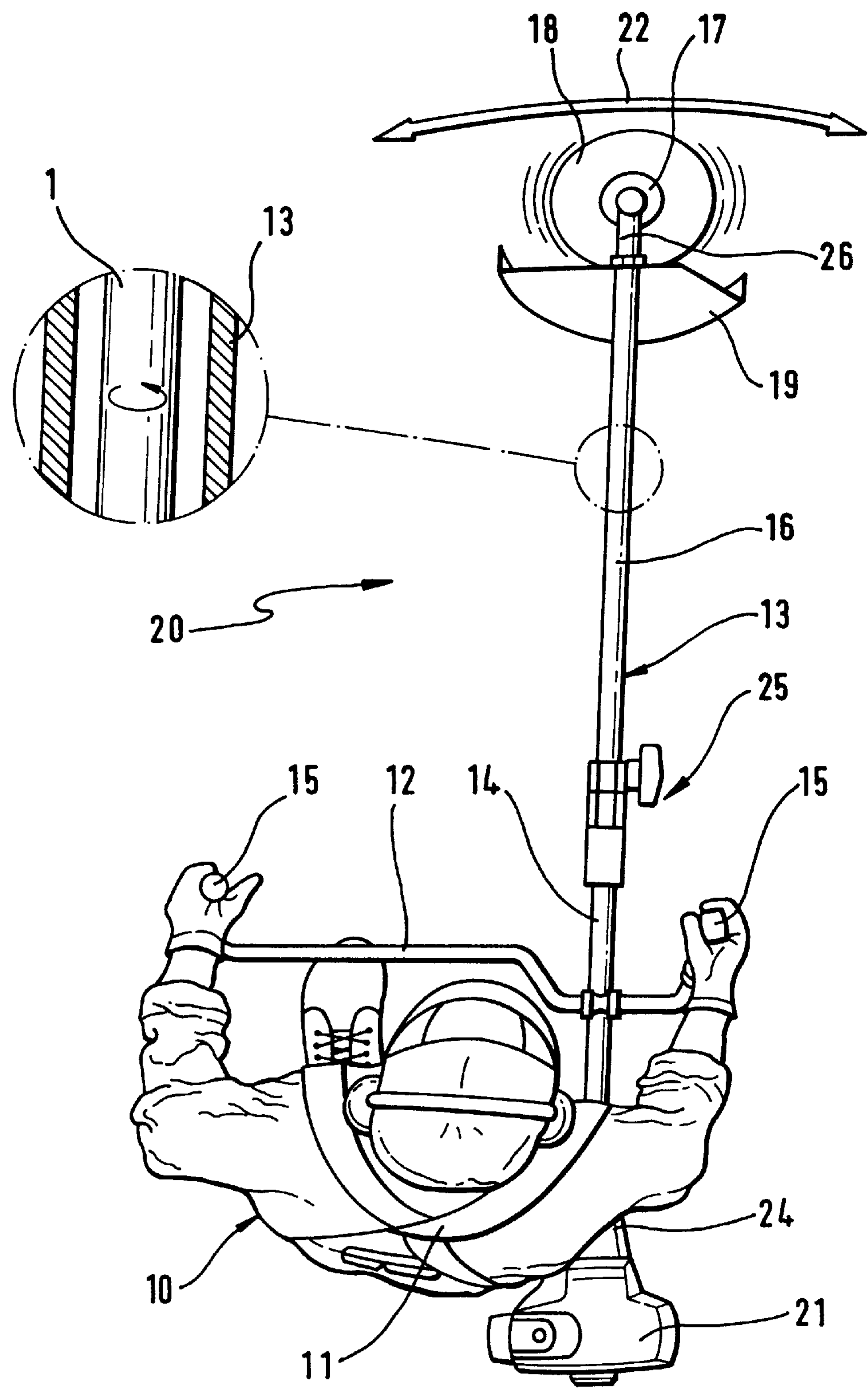
FIG. 1 shows a free-cutting device that is being carried and guided by an operator.

The connection of the present invention is characterized primarily in that one of the shaft sections has an insertion end having a rotationally symmetrical, non-circular cross-sectional configuration, wherein the insertion end is introduceable into a driving sleeve coaxially secured on the other shaft section, the driving sleeve having a coupling cross-sectional configuration that corresponds to the insertion end, wherein the driving sleeve has an axial introduction adapter that has at least one inwardly projecting introduction ramp, which extends over an angle of curvature between two adjacent large diameters of the coupling cross-sectional configuration, and wherein the at least one introduction ramp includes an axially decreasing ramp surface that forms a shoulder for the insertion end.

A reliable and easily detachable interlocking connection of the shaft sections that are to be coupled is provided by embodying one of the sections with an insertion end having a rotationally symmetrical non-circular cross-sectional configuration, wherein this insertion end can be introduced into a driving sleeve that is coaxially secured to the other shaft section. In this connection, the driving sleeve has a coupling cross-sectional configuration that corresponds to the cross-section of the insertion end, and is oversized to enable longitudinal movement. The cross-sections are advantageously cornered, expediently being quadratic. Independent of the relative angular rotational positions of the shaft sections relative to one another, during introduction into the driving sleeve the insertion end, in the axial introduction adapter, automatically moves into alignment with the coupling cross-sectional configuration in the driving sleeve. The introduction adapter has at least one inwardly projecting introduction ramp, which extends over an angle of curvature between two adjacent large diameters of the couple cross-sectional configuration while forming an axially decreasing ramp surface upon which the insertion end is automatically guided in alignment with the coupling cross-sectional configuration.

If more than one introduction ramp is provided the ramp surfaces thereof decrease in the same direction of rotation about the shaft axis. The coupling cross-sectional configuration expediently has an even number of large diameters, whereby the introduction ramps are respectively disposed across from one another and ensure a uniform guidance of the insertion end. Adjacent to the introduction ramps as seen in the circumferential direction a free section is respectively disposed between the introduction ramps, with the non-guided portions of the insertion end being able to move freely. With the quadratic coupling cross-sectional configuration, in conformity with the two quadratic diagonals two introduction ramps are provided on opposite cross-sectional sides.

The introduction adapter can be monolithically formed on the driving sleeve, with the cross-section of the driving sleeve being expanded in stages in order to rotatationally movably receive the insertion end of the other shaft section, with the wall portions of the driving sleeve that are retained forming the introduction ramps.

Pursuant to a further advantageous specific embodiment of the present invention, the introduction ramp is formed by a bracket-like member, the free ends of which are held on the driving sleeve. In this connection, the member can expediently be inserted into appropriate bores or openings in one end face of the sleeve. In this connection, the openings in the driving sleeve are disposed adjacent to two large diameters of the coupling cross-sectional configuration. The projection portion of the member forms the introduction ramp, upon which, during joining of the shaft sections, the insertion end is guided in line with the coupling cross-sectional configuration of the driving sleeve. The member is particularly advantageously bent from a continuous wire that expediently has two parallel legs that lead to the free ends, and a central portion that forms the introduction ramp. The wire member is economical to produce and can be easily inserted into the end face of the driving sleeve for a precise introduction of the insertion end. If the member is made of spring plate, the member can be installed on the driving sleeve such that it is wedged thereon with spring force.

Further specific features of the present invention will be described in detail subsequently.

DESCRIPTION OF THE PREFERRED EMBODIMENTS

Referring now to the drawings in detail, FIG. 1 illustrates a pre-cutting device 20, such as a trimmer, cutting saw, brush cutter or the like. Disposed at the upper end 24 of the guide tube 13 of the device 20 is a drive motor 21. Disposed at the opposite, lower end 26 of the guide tube 13 is a cutter head 17 that includes a cutting tool means 18. Mounted in the guide tube 13 is a drive shaft 1 which is acted upon by the drive motor 21 and rotatingly drives the tool 18. The tool 18 serves for cutting grass, brush , or the like. To protect an operator 10 who is holding and guiding the device 20, a protective shield 19 is provided on the guide tube 13 in the vicinity of the cutter head 17. The operator 10 carries the free-cutting device 20 by means of a belt or strap system 11, and moves the guide tube 13, and hence the cutter head 17, back and forth in the direction of the arrow 22 via a control or guide member 12. The member 12 is secured to the guide tube 13 near the upper end 24 and has two handles 15 for the operator 10. One of the handles 15 is provided with non-illustrated elements for operating the motor 21, which in the illustrated embodiment is in the form an internal combustion engine.

To facilitate transport, the long guide tube 13 and the drive shaft 1 mounted therein are made separable, are multi-section. The tube sections 14 and 16 of the guide tube 13 are plug connected together via a coupling sleeve or socket 25 for the operation of the free-cutting device 20. When the guide tube 13 is disassembled, the upper tube section 14 remains connected to the drive motor 21, while the lower tube section 16 remains connected to the cutter head 17. Disposed in the tube section 14 and 16 of the guide tube 13 are the respectively associated shaft sections of the similarly split of multi-section drive shaft 1. The shaft sections of the drive shaft 1 are interlockingly coupled with one another in the region of the coupling socket 25. The tube sections 14 and 16 are telescoped and are secured by a clamp or screw connection, which in the illustrated embodiment is established by tightening a toggle screw or the like of the socket 25. When the tube sections 14 and 16 are fit into one another or telescoped, the ends of the shaft sections of the drive shaft interengage and are thus interconnected so as to move together. The drive shaft, and in correspondence therewith also the guide tube, can also be split into more than two parts.

Figure 2:
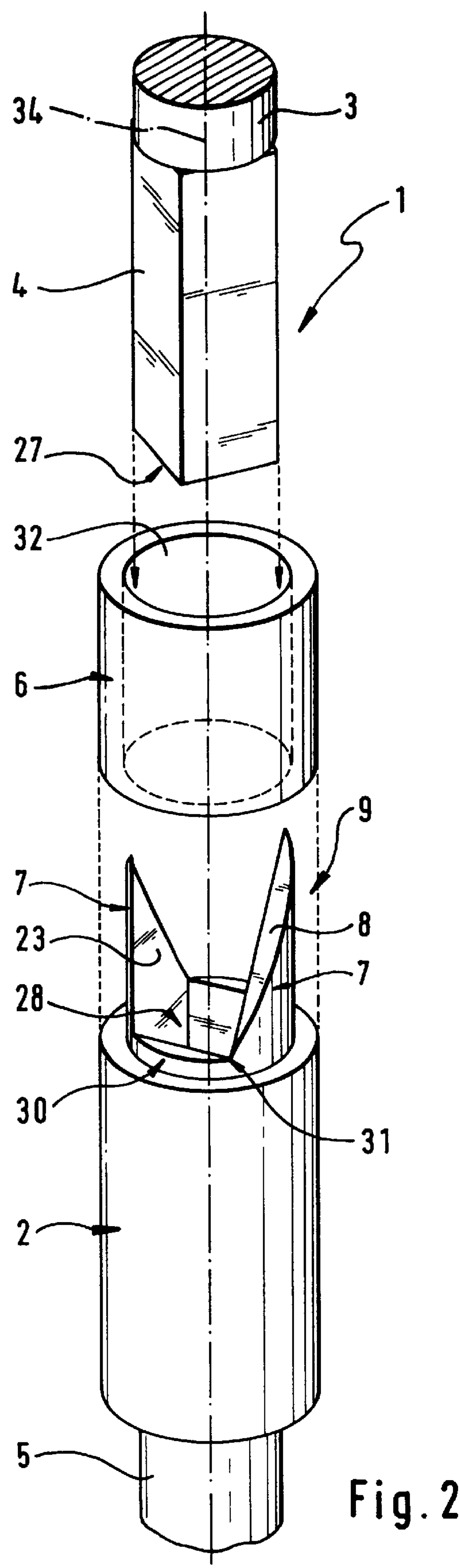
FIG. 2 is an exploded view of one exemplary embodiment of the inventive connection of the shaft sections of the drive shaft, and shows an introduction adapter.

The interlocking connection of the two shaft sections of the drive shaft is illustrated in FIG. 2. An insertion end 4 of one of the shaft sections 3 that is to be coupled has a rotationally symmetrical, non-circular cross-sectional configuration; the shaft section 3 can be inserted into a driving sleeve 2 that is coaxially secured to the other shaft section 5. The interior of the driving sleeve 2 has a coupling cross-sectional configuration 28 that corresponds to the cross-section of the insertion end 4 and cooperates in an interlocking manner therewith. The coupling cross-sectional configuration 28 is oversized relative to the insertion end 4 of the other shaft section 3 in order to enable the insertion movement of the insertion end 4 during assembly and disassembly of the drive shaft 1. In the illustrated embodiment, the insertion end 4 and the driving sleeve 2 have a quadratic shape; however, other rotationally symmetrical and non-circular across-sectional contours could also be utilized, with angular cross-sections being advantageous and easy to manufacture. To receive the other shaft section 3 in an interlocking manner, the driving shaft 2 is fixedly secured to the associated shaft section 5.

The driving sleeve 2 includes an axial mounting or introduction adapter 9, which when the shaft section 3 is introduced into the driving sleeve 2 automatically brings the cross-section of the insertion end 4 into alignment with the coupling cross-sectional configuration 28 of the driving sleeve 2. When the insertion end 4 is inserted through the insertion opening 32 of the driving sleeve the quadratic cross-section of the insertion end 4 is brought by the introduction adapter 9 into the required angular rotational position of the coupling cross-sectional configuration 28 of the driving sleeve 2. In the introduction adapter 9, for receiving the insertion end 4 in a rotationally movable manner, the coupling cross-sectional configuration is widened in stages accompanied by the formation of two inwardly projecting introduction ramps 7 that over the angle of curvature respectively extend between two adjacent large diameters of the quadratic coupling cross-sectional configuration 28. With a quadratic cross-sectional shape, the introduction ramps extend in the circumferential direction of the sleeve from one cross-sectional corner to the other, in other words, extend between the diagonals D of the quadratic shape. The quadratic coupling cross-sectional configuration has an even number of large diameters (=diagonals D), as a result of which the introduction ramps 7 are disposed across from one another in a radially symmetrical manner, and in the circumferential direction of the introduction adapter 9 curvature sections having a widened cross-section are respectfully disposed adjacent to the introduction ramps. The insertion end 4 is therefore maximally rotationally movable in the introduction adapter 9 about the angle of alignment of its rotational symmetry that describes its cross-sectional shape. The inwardly projecting introduction ramps 7 each include an axially decreasing ramp surface 8 that form shoulders for the introduced insertion end 4 of the shaft section 3 that is to be coupled. If the insertion end 4 is inserted through the insertion opening 32 in an angular rotational position that is shifted relative to the driving sleeve 2, the end face 27 of the insertion end 4 comes to rest against the introduction ramps 7. The insertion end 4 glides on the decreasing ramp surfaces 8 with an increasing depth of insertion accompanied by correction of the rotational movement into the sleeve, and at the base of the ramp surfaces 8, namely at the corners of the quadratic coupling cross-sectional configuration 28, are interlockingly introduced into the sleeve.

Figure 2A:
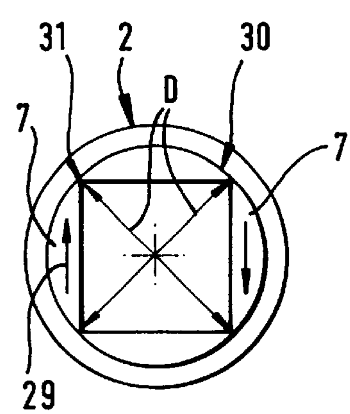
FIG. 2*a* is a plan view of the driving sleeve illustrated in FIG. 2.

The position of the introduction ramps 7 can be recognized particularly clearly in the plan view of the introduction adapter 9 in FIG. 2*a*. Even if the insertion end 4 is introduced into the driving sleeve 2 in such an angular rotation position that the cross-sectional corners of the insertion end 4 are disposed slightly next to the corners 31 of the quadratic coupling cross-sectional configuration 28, two corners of the insertion end 4 will always be aligned with the introduction ramps 7 and will slide downwardly due to the inclines 29 of the ramp surfaces 8 and will be rotated to the adjacent cross-sectional corners 31. The ramp surfaces 8 of introduction ramps 7 are each inclined in the same direction of rotation in the direction of the arrows 29 about the axis 34 of the drive shaft 1. The incline of the ramp surfaces 8 is greater than 40%, thus ensuring an introduction of the insertion end 4 into the driving sleeve 2 without frictional resistance against the ramp surfaces 8. The ramp surfaces 8 extend linearly between the axially upper point, which, in alignment with one corner 31 of the quadratic cross-section, is disposed in the plane of the insertion opening 32, and the adjacent quadratic cross-sectional corner 31 at the base of the introduction adapter 9.

In the illustrated embodiment, the introduction adapter 9, by means of a reduction in diameter of the driving sleeve 2, is formed to a collar or extension 30, whereby the shell or surface of the extension 30, with the exception of the ramp surfaces 8, i.e. the introduction ramps 7, is eliminated for expansion of the cross-section of the adapter. The openings or interruption of the surface of the extension 30 can be provided in a very simple manner, whereby the introduction ramps 7, with their ramp surfaces 8, project axially out of the driving sleeve 2, i.e. out of the remaining extension base 30. In this connection, the projecting surfaces 23 of the introduction ramps 7 line up with the contour of the coupling cross-sectional configuration 28. A hollow-cylindrical extension sleeve 6 can be placed over the extension 30, which is essentially formed by the remaining introduction ramps 7. The ends of the introduction ramps 7 are pointed in order at any conceivable angular rotational position of the shaft section 3 that is to be coupled at a plug connection not to offer to the insertion end 4 any surface that could lead to jamming. The height of the extension sleeve 6 corresponds to the axial length of the introduction adapter 9, as the result of which the introduction ramps 7 can be received completely in the extension sleeve 6. The outer diameters of the extension sleeve 6 and of the driving and coupling sleeve 2 are the same, so that when the extension sleeve 6 is in place, a uniform member results that in the vicinity of its insertion opening 32 contains the introduction adapter 9.

The edges of the insertion end 4, and in particular the edges of the end face 27 thereof, are not beveled. In this way, a maximum support surface of the end face 27 upon the ramp surfaces 8 is made available.

Figure 3:
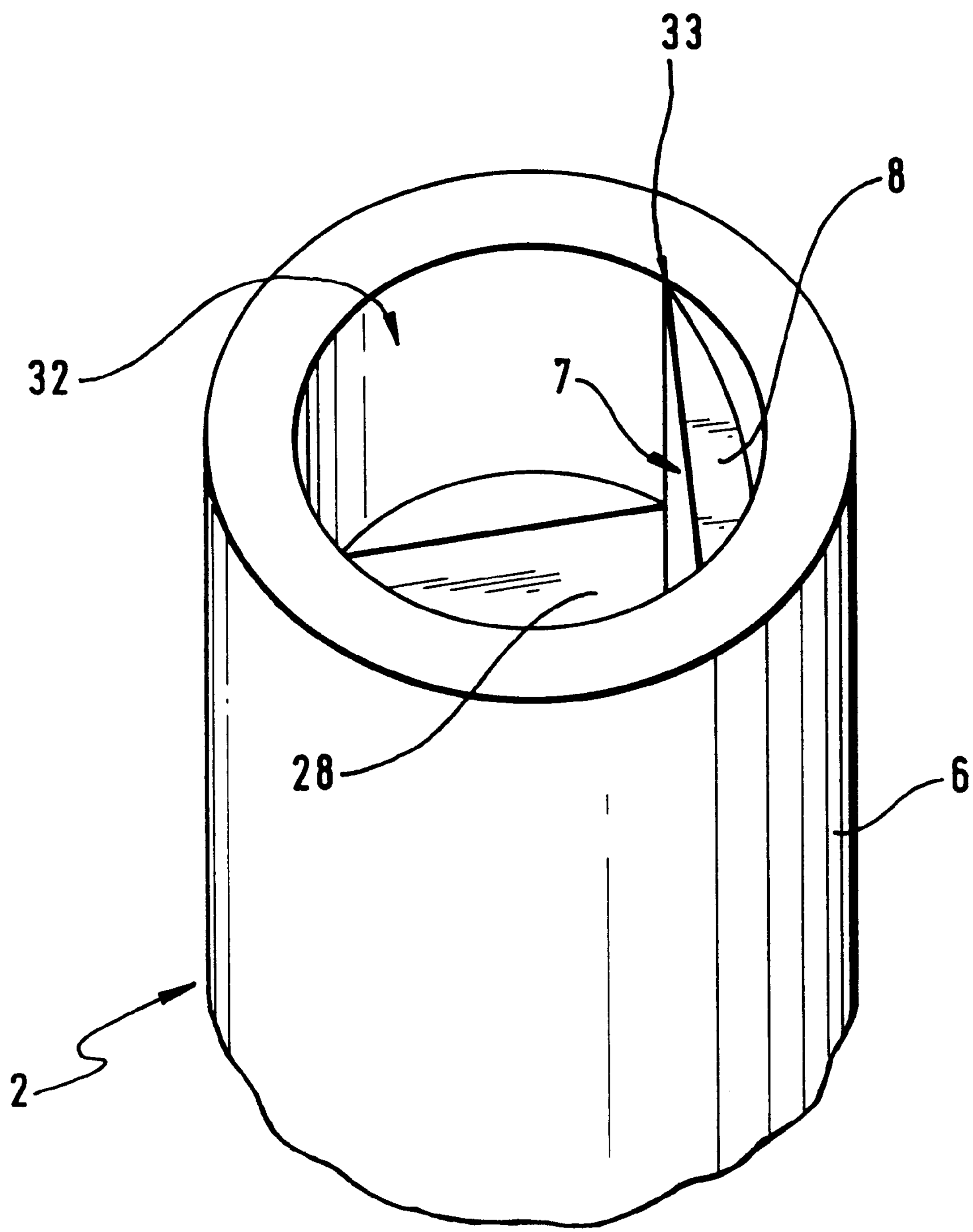
FIG. 3 shows the driving sleeve of FIG. 2 with an extension sleeve placed upon the introduction adapter.

As can be seen from FIG. 3, the points or tips 33 of the introduction ramps 7 are disposed in the plane of the insertion opening 32 of the driving sleeve 2, and in particular the extension sleeve 6 thereof. Thus, the tips 33 are disposed within the driving sleeve 2, i.e. the extension sleeve 6, and are protected by the casing of the sleeve. Even after longer periods of operation and a number of assemblies and disassembles, the introduction of the insertion end 4 is reliably effected by guidance upon the ramp surfaces 8 of the introduction ramps 7 to the actual coupling cross-sectional configuration 28 of the driving sleeve 2.

Instead of being embodied as an extension over which an extension sleeve can be placed, the introduction adapter 9 with the described introduction ramps can also be formed directly in the end portion of the driving sleeve 2, for example via an erosion manufacturing process.

Figure 4:
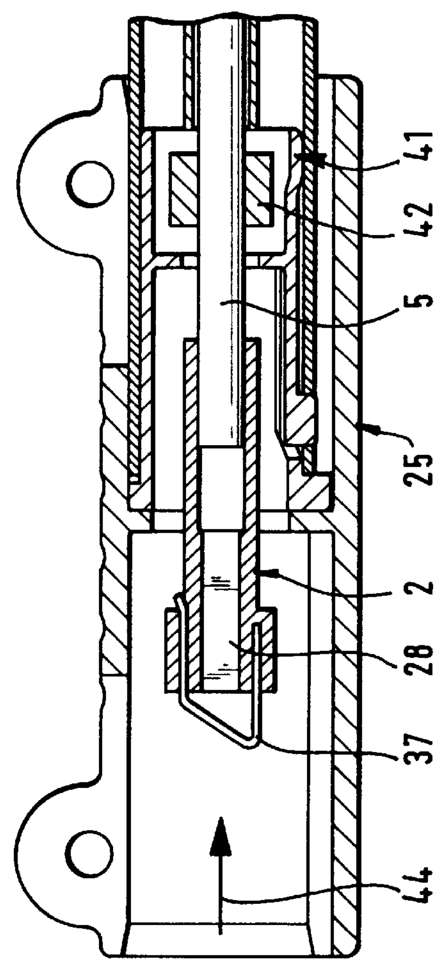
FIG. 4 is a cross-sectional view of a separable drive shaft showing a further exemplary embodiment of the inventive introduction adapter.

FIG. 4 illustrates a cross-section through the connection for the tube sections of the separable guide tube 13 and of the drive shaft disposed therein, whereby similar to the embodiment of the connection according to FIGS. 2 and 3, the shaft section 3 of the drive shaft has an insertion end 4 that has a quadratic cross-section. The other shaft section 5 carries a driving sleeve 2 that in its similarly quadratic coupling cross-sectional configuration 28 inter-lockingly receives the insertion end 4 so as to be able to transmit torque. In this connection, each shaft section 3, 5 is mounted in an associated section of the guide tube 13. In the assembled state, the ends of the guide tube sections are securely held in place in the coupling socket 25. Respective assembly sleeves 41 are introduced into the end sections of the guide tube parts that are to be joined together until a radial collar thereof rests against the respective tube part. The ends of the drive shaft that are to be interconnected extend through the assembly sleeves 41. Each of the assembly sleeves has an inwardly extending flange 43 that retains a catch shoulder 42 provided on the shaft sections 3 and 5 within the interior of the guide tube sections. This prevents the parts of the drive shaft from sliding out in the disassembled state of the guide tube. The catch shoulders 42 can be made of plastic.

In this embodiment of the inventive connection of the tube and shaft sections, the introduction adapter for introduction of the insertion end 4 into the coupling cross-sectional configuration 28 of the driving sleeve 2 is embodied as a wire member 37. In this connection, the wire member 37 is provided with the introduction ramp against which the insertion end 4 is guided during joining together of the shaft sections in the direction of the arrow 44 in alignment with the coupling cross-sectional configuration 28.

Figure 5B:
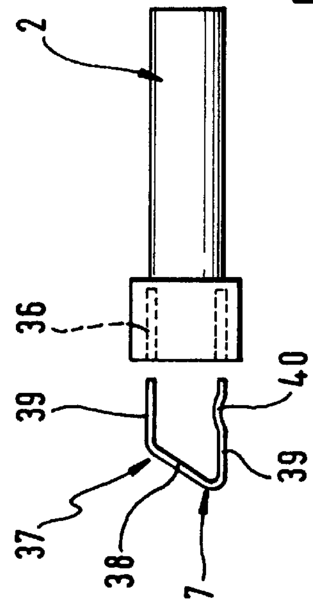
FIG. 5*b* is a side view of the driving sleeve of FIG. 4.

As shown in particular in FIG. 5*b*, the wire member 37 is bent from a continuous wire and has two parallel legs 39 at the two free ends. The legs 39 are respectively inserted into bores or openings 36 in the end face 35 of the driving sleeve 2. The wire member 37 is made of spring plate, and at least one of the legs 39 thereof is provided with a curved retention part 40 that holds the inserted wire member 37 in place in the driving sleeve 32 by means of wedging action. The central portion 38 of the wire member 37 forms the introduction ramp 7, which extends between the unequal length legs 39 at an incline.

Figure 5A:
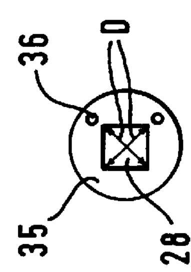
FIG. 5*a* is a plan view of the driving sleeve of FIG. 4.

FIG. 5*a* is a plan view upon the end face 35 of the driving sleeve 2. The insertion openings 36 for the wire member 37 are disposed next to the large diameter D of the quadratic coupling cross-sectional configuration 28. The central portion 38 of the wire member 37, and hence the introduction ramp 7, therefore extends parallel to the edge of the coupling cross-sectional configuration 28 and can be next to or in line with the opening edge of the coupling cross-sectional configuration 28. If during the assembly of the shaft sections of the drive shaft the insertion end, with its quadratic cross-section, is not aligned with the coupling cross-sectional configuration 28, one corner of the insertion end of the shaft end that is to be introduced will come to rest on the wire member 37 and will be guided by the incline of the introduction ramp 7 to the corner of the coupling cross-sectional configuration 28 at the base of the introduction ramp adjacent to the insertion opening 36. Pursuant to an alternative configuration of the connection, the driving sleeve 2 can be provided with longitudinally or transversely encircling grooves in which the wire member 37 is held. In this connection, the legs of the wire member are bent to the free ends in conformity with the path of the groove, and can be elastically clipped into the grooves.

The specification incorporates by reference the disclosure of German priority document 298 09 694.3 of May 29, 1998 and 299 07 780.2 of May 3, 1999.

The present invention is, of course, in no way restricted to the specific disclosure of the specification and drawings, but also encompasses any modifications within the scope of the appended claims.

What we claim is:

1. A connection for sections of a separable guide tube and of a drive shaft disposed therein, wherein said tube sections are axially interconnected, comprising:

means for interlockingly coupling shaft sections of said drive shaft together, wherein ends of said shaft sections interengage one another, and wherein one of said shaft sections has an insertion end having a rotationally symmetrical, non-circular cross-sectional configuration, said interlocking means further including a driving sleeve coaxially secured on another one of said shaft sections, said driving sleeve having a coupling cross-sectional configuration that corresponds to said insertion end of said one shaft section, wherein said insertion end is introduceable into said driving sleeve, and wherein an axial introduction adapter is provided on said driving sleeve, wherein said introduction adapter has at least one inwardly projecting introduction ramp, which extends over an angle of curvature between two adjacent large diameters of said coupling cross-sectional configuration of said driving sleeve, and wherein said at least one introduction ramp includes an axially decreasing ramp surface that forms a shoulder for said insertion end of said one shaft section.

2. A connection according to claim 1, wherein a projecting surface of said of at least one introduction ramp is aligned with the contour of said coupling cross-sectional configuration.

3. A connection according to claim 1, wherein said ramp surface extends linearly.

4. A connection according to claim 1, wherein said ramp surface has an incline of greater than 40%.

5. A connection according to claim 1, wherein a plurality of introduction ramps are provided, and wherein said ramp surfaces thereof decrease in the same direction of rotation about an axis of said drive shaft.

6. A connection according to claim 1, wherein said coupling cross-sectional configuration of said driving sleeve has an even number of large diameters, and wherein said at least one introduction ramp is respectively disposed across from said large diameters.

7. A connection according to claim 1, wherein said coupling cross-sectional configuration of said driving sleeve is cornered.

8. A connection according to claim 7, wherein said insertion end of said one shaft section, and said coupling cross-sectional configuration of said driving sleeve, have quadratic cross-sections.

9. A connection according to claim 5, wherein in a circumferential direction of said introduction adapter adjacent to said introduction ramps, each curvature section has an expanding cross-section.

10. A connection according to claim 1, wherein said introduction adapter is formed by at least one member having free ends that are held on said driving sleeve.

11. A connection according to claim 10, wherein said free ends of said member are insertable into appropriate openings in an end face of said driving sleeve.

12. A connection according to claim 10, wherein said member is bent from a continuous wire, preferably made of spring plate.

13. A connection according to claim 12, wherein said openings in said driving sleeve are disposed adjacent to two large diameters of said coupling cross-sectional configuration.

14. A connection according to claim 12, wherein said wire member has two approximately parallel legs that lead to free ends, and a central portion that forms said introduction ramp.

15. A connection according to claim 1, wherein said driving sleeve has a cross-section that widens by stages for receiving said insertion end of said one shaft section in a rotationally movable manner, and wherein wall sections that remain form said at least one introduction ramp.

16. A connection according to claim 15, wherein said at least one introduction ramp has a pointed end.

17. A connection according to claim 15, wherein said introduction adapter is in the form of an extension formed by a reduction in diameter of said driving sleeve, said extension having a shell that is eliminated with the exception of said at least one introduction ramp, and wherein a hollow cylindrical extension sleeve is disposable over said extension.

18. A connection according to claim 17, wherein said extension sleeve and said driving sleeve have the same outer diameter.

19. A connection according to claim 15, wherein said insertion end of said one shaft section has an end face that is not beveled.

20. A connection according to claim 16, wherein said pointed ends of said at least one introduction ramp are disposed in the plane of an insertion opening of said driving sleeve.

* * * * *